United States Patent Office 3,351,495
Patented Nov. 7, 1967

3,351,495
BATTERY SEPARATOR
Donald Wayne Larsen, Bowie, and Clifton Leroy Kehr, Ednor, Md., assignors to W. R. Grace & Co., Cambridge Mass., a corporation of Connecticut
No Drawing. Filed Nov. 22, 1966, Ser. No. 596,056
11 Claims. (Cl. 136—146)

This application is a continuation-in-part of application Ser. No. 300,682, filed Aug. 7, 1963, now abandoned, and copending application Ser. No. 373,824, filed June 9, 1964, now abandoned.

This invention is directed to a battery separator and to the method of making such. In one particular aspect, this invention is related to a novel battery separator of excellent chemical and physical properties which is comprised of a microporous sheet of very high molecular weight polyolefin. In another particular aspect, it relates to a microporous sheet comprised of very high molecular weight oplyolefin and an inert filler material.

Storage batteries employ an acid or an alkaline electrolyte. Two widely used batteries are a lead-acid type and an alkaline type, e.g., silver-cadmium. Separators are included in the batteries to prevent direct contact between plates of opposite polarity while freely permitting electrolytic conduction. The separator for the acid type of battery is generally comprised of a sheet or web with ribs on at least one side. The separator for the alkaline type of battery is usually a thin sheet or film. The method of the instant invention may be used to form separators for acidic or alkaline batteries.

The battery separator of the present invention comprises a microporous sheet of polyolefin having a moleculart weight of at least 300,000, a standard load melt index of substantially 0 and a reduced viscosity of not less than 4.0. The battery separator preferably comprises a homogenous mixture of 8 to 100 volume percent of very high molecular weight polyolefin, 0 to 40 volume percent of a plasticizer, and 0 to 92 volume percent of inert filler material.

In a preferred embodiment, the battery separator comprises 8 to 93 volume percent polyolefin, 7 to 92 volume percent filler and 0 to 15 volume percent plasticizer. A more preferred composition comprises 40 to 60 volume percent polyolefin, 40 to 60 volume percent filler and 1 to 10 volume percent plasticizer and, more particularly, 46.5 volume percent polyolefin, 46.5 volume percent filler and 7 volume percent plasticizer. The battery separator also contains 0 to 15 weight percent antioxidant, based on the weight of the polyolefin. In a preferred embodiment, 0.1 percent by weight is employed.

The microporous battery separators of this invention have a pore size which is generally less than 1 micron in diameter, preferably with greater than 50 percent of the pores being 0.5 micron or less in diameter. In most cases, at least 90 percent of the pores have a diameter smaller than 0.5 micron.

According to this invention, the battery separator is produced by a process which comprises blending a composition of from 5 to 65 volume percent of high molecular weight polyolefin, 5 to 60 volume percent of an inert filler material, and the volume percent difference between the total amount of the polyolefin and the inert filler and 100 percent being a plasticizer (a minimum of 30 volume percent plasticizer is required), forming said composition into sheet form, and subsequently extracting from said sheet by means of a suitable solvent at least a portion of a component selected from the group consisting of the inert filler and the plasticizer.

In a preferred embodiment, 15 volume percent polyolefin, 15 volume percent filler and 70 volume percent plasticizer are blended together, extruded to provide a flat sheet and then sufficient plasticizer is extracted to provide a finished separator composed of 46.5 volume percent polyolefin, 46.5 volume percent filler and 7 volume percent plasticizer.

It is an object of this invention to use such a blend in the production of microporous battery separator. It is a further object of this invention to provide a process for producing such battery separators from a very high molecular weight, polyolefin-filler-plasticizer blend. Other objects, features, and advantages of this invention will be apparent to those skilled in the art in view of the following more detailed description of the invention.

In this invention, it is necessary to use polyolefin having a standard load melt index of 0, an average molecular weight of at least 300,000 and a reduced viscosity of not less than 4.0 in order to be able to tolerate significant amounts of filler without producing a composition which is excessively brittle. For example, polyethylene having a standard load melt index of 0 is very unlike conventional polyethylene having a standard load melt index of 0.7 to 5.0 and an average molecular weight of about 100,000 to 90,000 which yields brittle products at relatively low filler concentrations. Moreover, the high molecular weight polyolefin confers strength and flexibility to the final composition.

The polyolefin can be comprised of a mixture of a high molecular weight polyolefin with a standard load melt index of 0 and a compatible lower molecular weight polyolefin with a standard load melt index higher than 0. An amount of the lower molecular weight polyolefin can be used a long as such amount does not remove the polyolefin from above-set forth minimum molecular weight, standard load melt index and reduced viscosity values. Ordinarily, the standard load melt index of the lower molecular weight polyolefin will range from about 0.1 to about 5. Representative of the polyolefins of high and low molecular weight operable in the instant invention are polyethylene, polypropylene, polybutene, ethylene-propylene copolymers, ethylene-butene copolymers, propylene-butene copolymers and ethylene-propylene-butene copolymers.

The term "high molecular weight polyolefin" as employed herein is intended to refer to a polyolefin having an average molecular weight of at least 300,000, a standard load melt index of substantially 0, and a reduced viscosity of not less than 4.0. The employment of a polymer having the above minimum properties is critical in the present invention. Polymers having characteristics outside of these limits have been found to be unsatisfactory. For example, a polyolefin (polyethylene) having an average molecular weight of 200,000, a standard load melt index of 0.2 and a reduced viscosity of 2.6 was found to be unsatisfactory for the present invention, in that it produced a separator which was too brittle and too weak. Severe processing difficulties were also encountered. In a particularly preferred embodiment, polyethylene having an average molecular weight of 2,000,000, a standard load melt index of 0 and a reduced viscosity of 15 is employed.

The standard load melt index (SLMI) was measured as specified in ASTM D 1238–57T (Condition E) using a standard load of 2,160 grams. The high load melt index (HLMI) was measured as specified in ASTM D 1238–57T (Condition F) using a load of 21,600 grams.

Reduced viscosity was determined in a solution of 0.02 g. of the polyolefin in 100 g. of decalin at 130° C.

The instant process produces microporous battery separators which meet minimum electrical resistance requirements and posses acceptable tensile strength and porosity. When the battery separator is provided with rib members, these members can be formed from a number of polymeric compositions known to the art. For example, they can be formed from the same composition as that of the battery separator or from such materials as other polyolefins, polyvinyl chloride, as well as filled and/or foamed compositions thereof. Alternatively, the sheet is also grooved or embossed to provide ribs. In still another alternative, a rib of the above-described character is applied to the up-thrust portion of the embossing or on the flat portion of the sheet beside the up-thrust portion.

The usage of inorganic fillers and extenders for rubbers and some other resins is well known by the prior art. Most attempts to use these fillers to extend polyolefins have met with failure due to the increased crystallinity of these resins. Products are obtained which are too brittle to be useful as general purposes resins or as base compositions. In our copending application, U.S. S.N. 285,181, filed May 20, 1963, now abandoned, and U.S. S.N. 354,064, filed Mar. 23, 1964, we disclosed a polyolefin-filler composition which overcomes the aforementioned deficiencies such as brittleness. In that application, a composition of matter and a method are disclosed for producing inexpensive blends of fillers and polyolefins which retain to a surprising extent much of the flexibility, impact resistance, and strength of the base polymers.

The polyolefin must be substantially insoluble in the solvents used and at the temperatures used to extract the plasticizer or filler from the polyolefin-filler-plasticizer composition. Such insolubility or inertness to the action of solvents is imparted to the polyolefin by its crystallinity content or by the judicious choice of solvent used in the extraction procedure. The partially crystalline polyolefin such as polyethylene, and isotactic polypropylene, are ideally suited to such an application because they are substantially insoluble in common hydrocarbons and other organic and aqueous solvents at low temperatures.

Conventional stabilizers or antioxidants are employed in the compositions of the present invention to prevent thermal and oxidative degradation of the polyolefin component. Representative of the stabilizers are 4,4 thiobis (6 - tert - butyl - m - cresol) ("Santonox"), and 2,6-di-tert-butyl-4-methylphenol ("Ionol").

The filler provides the primary means by which the plasticizer is absorbed and held in the instant composition. It should, therefore, not be soluble in the plasticizer. The capacity of the filler particles to absorb and hold the plasticizer in the composition is proportional to its surface area. Highsurface area fillers are either materials of very small particle size or materials of a high degree of porosity. Generally, the size of the filler particles can range from an average of about 0.01 micron to about 10 microns in diameter depending upon the porous character of the filler. The surface of the area of the filler can range from about 30 to 950 square meters per gram. Preferably, the surface area of the filler should be at least 100 square meters per gram. Ordinarily, amounts of filler used in the instant composition can range from about 5 to 60 volume percent. While the high surface areas are preferred, fillers having relatively low surface areas, e.g., 1 square meter per gram or less are also employed satisfactorily, particularly for alkaline battery separators. The specfic amount of filler used will depend primarily on its surface area and the amount of plasticizer used.

The filler can be soluble or insoluble in water. Representative of the fillers which are substantially water insoluble and operable in the instant invention are carbon black, coal dust and graphite; metal oxides and hydroxides such as those of silicon, aluminum, calcium, magnesium, barium, titanium, iron, zinc, and tin; metal carbonates such as those of calcium and magnesium; minerals such as mica, montmorillonite, kaolinite, attapulgite, asbestos, talc, diatomaceous earth and vermiculite; synthetic and natural zeolites; portland cement; precipitated metal silicates such as calcium silicate and aluminum polysilicate; alumina silica gels; wood flour, wood fibers and bark products; glass particles including microbeads, hollow microspheres, flakes and fibers; and salts such as molybdenum disulfide, zinc sulfide and barium sulfate.

Illustrative of the water-soluble fillers operable in the present invention are inorganic salts such as the chlorides of sodium, potassium, and calcium; acetates such as those of sodium, potassium, calcium, copper and barium; sulfates such as those of sodium, potassium and calcium; phophates such as those of sodium and potassium; nitrates such as those of sodium and potassium; carbonates such as those of sodium and potassium and sugar.

In the embodiment of this invention in which the battery separator contains unextracted filler, the filler should be preselected with respect to end use, which is to say, battery separators with alkali insoluble fillers should be used only in alkaline batteries, and acid insoluble fillers should be used only in acid batteries. If so used, the filler is not extracted by the battery electrolyte. Neutral fillers, or fillers that do not react with either acid or alkaline electrolytes, can of course be used with either acid or alkaline batteries. Examples of neutral fillers are carbon black, coal dust, graphite and barium sulfate. Representative of the fillers suitable for use in alkaline batteries are the oxides, hydroxides and carbonates of calcium, magnesium, barium and iron. A typical filler for acid batteries is silica.

The preferred filler is dry, finely divided silica. It has been found that separators produced from compositions containing this filler have unusually small pore size, e.g., as low as 0.002 micron and void volume and are readily wet by electrolyte.

It should be understood that any of the commercially available wetting agents known to the art, such as sodium alkyl benzene sulfonate, sodium lauryl sulfate, dioctyl sodium sulfosuccinate, and isooctyl phenyl polyethoxy ethanol, can be used to enhance the wettability of the battery separator by electroylte. These wetting agents can also be used to enhance the wettability of the filler prior to its inclusion in the composition.

The plasticizer of the instant composition improves the processability of the composition, i.e., lower the melt viscosity, or reduces the amount of power input which is required to comopund and to fabricate the composition. In addition, since the plasticizer is the component which is easiest to remove from the polymer-filler-plasticizer composition, it is useful in imparting porosity to the battery separators.

The plasticizer can be soluble or insoluble in water. Representative of the water-insoluble plasticizers are organic esters such as the sebacates, phthalates, stearates, adipates and citrates; epoxy compounds such as epoxidized vegetable oil; phosphate esters such as tricresyl phosphate; hydrocarbon materials such as petroleum oil including lubricating oils and fuels oils, hydrocarbon resin and asphalt and pure compounds such as eicosane; low molecular weight polymers such as polyisobutylene, polybutadiene, polystyrene, atactic polypropylene, ethylene-propylene rubber; ethylene-vinyl acetate copolymer, oxidized polyethylene, coumarone-indene resins and terpene resins; tall oil and linseed oil.

Illustrative of the water-soluble plasticizers are ethylene glycol, polyethylene glycol, polypropylene glycol, glycerol, and ethers and esters thereof; alkyl phosphates such as triethyl phosphate; polyvinyl alcohol; polyacrylic acid and polyvinyl pyrrolidone.

When a plasticizer is used which is not removed from the composition during the extraction step but forms part of the battery separator, it imparts flexibility, high elongation and imparts resistance to the battery separator.

There are a number of water-insoluble, normally solid plasticizers which are sufficiently inert to form a part of the battery separator. Typical examples of these plasticizers are polyisobutylene, polybutadiene, polystyrene, atactic polypropylene, ethylene - propylene rubber and ethylene vinyl acetate copolymer. Generally, when this type of plasticizer is used, it can be included in the battery separator in an amount as high as 40 percent by volume of the battery separator composition.

The preferred ranges for the components employed in forming the battery separator comprises from 7.5 to 40 volume percent of polyolefin, from 10 to 40 volume percent filler, and the difference between the total amount of polyolefin and filler and 100 percent being the plasticizer. The minimum amount of plasticizer which must be present in all compositions is 30 percent by volume. Examples of particularly preferred compositions are as follows:

| Polyolefin (Vol. Percent) | Filler (Vol. Percent) | Plastixizer (Vol. Percent) |
|---|---|---|
| 20 | 20 | 60 |
| 20 | 15 | 65 |
| 17 | 18 | 65 |
| 15 | 15 | 70 |
| 10 | 15 | 75 |

The above amounts are based upon the processing requirements of the composition, the physical properties necessary in the final product, and the cost of the composition. Based on these factors, the indicated amounts have been found to be acceptable. By specifying the amounts as percentages by volume, the percent by volume of the various ingredients expressed in terms of the specific gravity of the components is referred to. To determine the percent by volume, the individual components are weighed and the volume calculated from the known specific gravities.

A particularly preferred composition consists essentially of polyethylene having at least 50 percent by weight crystallinity, finely-divided silica and petroleum oil.

The components of the instant composition can be mixed by any conventional manner which will produce a substantially uniform mixture. To produce a particularly uniform mixture, the components can be premixed at room temperature in a blender. The polyolefin-filler-plasticizer dry blends are then fluxed in a conventional mixer such as a Banbury mixer or melt homogenized in a conventional two roll mill.

After being suitably mixed, the composition is molded or shaped in any conventional manner. Specifically, it can be fed to an extrusion, calendering, injection molding, or compression molding machine to be processed into its final form.

As used in this application, the terminology "sheet" is intended to define a unitary article, i.e., a battery separator consisting of a base web and a plurality of rib members. The web and rib members can be of the same material or of different materials. The terminology "film" is used to define a battery separator which does not have rib members and which can be very thin. Such a film is particularly suitable for use in alkaline batteries where it generally has a thickness of about 5 mils or less. The terminology "essentially flat surface" is intended to be generic to sheets and films and to refer to battery separators suitbale for usage in acid or alkaline batteries.

The rib members of the battery separator can also be formed by a conventional method such as by extrusion. In order to reduce the expense of fabrication, the rib members are preferably of the same composition as the base web or of foamed polypropylene, foamed filled polyvinyl chloride, or foamed filled polyethylene. The terminology "foamed polyethylene" or "foamed polypropylene" defines a polyolefin which has been foamed by conventional techniques, e.g., dry blended with a foaming agent such as azobisformamide plus zinc stearate, pelletized, and extrusion-foamed at a temperature of approximately 375° F. The terminology "foamed filled polyolefins" or "foamed filled polyvinyl chloride" is intended to define a polymer which has been dry blended with a foaming agent and a filler material such as carbon black or any of the other materials mentioned in this application. This dry blend is then pelletized and foamed. It is to be understood that the polyethylene used in the ribs need not be the same type used in the web, but may be of lower molecular weights and densities which may process more readily in the rib forming operation. It is also to be understood, however, that the rib members can be made of the same material as the base web. When this is desired, the web and rib members are extruded as a unitary article. This is achieved by replacing the regular die member of the extruder with a die which has been especially designed to mold the composition into the desired configuration. Alternatively, the rib members may be formed by embossing. By this procedure, a web is formed from the base composition. This web is then passed through a pair of embossing rollers to form the ribs on the web as a unitary article. The web can also be extracted with solvent before being passed through a pair of embossing rolls to form ribs on the web.

When the rib members are molded separately, they can be bonded to the base web by a number of methods well known in the art such as heat sealing or by means of an adhesive. The bonding of the rib members to the web can occur either before or after the inert filler and/or plasticizer are extracted. It has been found that if the extraction is carried out after the bonding, there are no material adverse effects upon the physical properties of the battery separator.

The specific extraction procedure and medium employed depends upon the component which is to be extracted. For example, if the plasticizer or the filler is to be extracted, a single stage extraction is used. However, if the plasticizer and the filler are to be extracted, a two-stage extraction may necessarily be required. Similarly, if two or more dissimilar plasticizers are used in the same composition, a multiple stage extraction may be required. Numerous extracting solvents are suitable for usage in this invention with the particular solvent depending upon the particular ingredient to be extracted. The solvent or extraction conditions should be chosen so that the polyolefin is essentially insoluble. For example, when petroleum oil to to be extracted from the molded composition, the following solvents are suitable: chlorinated hydrocarbons, such as trichloroethylene, tetrachloroethylene, carbon tetrachloride, methylene chloride, tetrachloroethane, etc.; hydrocarbon solvents such as hexane, benzene, petroleum ether, toluene, cyclohexane, gasoline, etc. If polyethylene glycol is to be extracted, the extraction medium can be water, ethanol, methanol, acetone, etc. If finely ground silica is to be extracted, the following solvents are suitable: aqueous or alcoholic sodium hydroxide, potassium hydroxide, etc., hydrofluoric acid solution. Generally, acids such as hydrochloric acid, can be used to extract metal oxides and metal carbonates.

The extraction temperature can range anywhere from room temperature up to the melting point of the polyolefin as long as the polyolefin does not dissolve.

The time of the extraction will vary depending upon the temperature used and the nature of the plasticizer or filler being extracted. For example, when a higher temperature is used, the extraction time for an oil of low viscosity can be only a few minutes, whereas if the extraction is performed at room temperature, the time requirement for a polymeric plasticizer can be in order of several hours.

The final composition of the separator will depend upon the original composition and the component or components extracted. When the plasticizer and the inert filler are removed from the molded composition, the microporous battery separator will consist essentially of a polyolefin.

Unless otherwise stated, the pore size and the pore volume of the battery separator were measured using the mercury intrusion method described in Ritter, H. L., and Drake, L. C., Ind. Eng. Chem. Anal. Ed., 17, 787 (1945).

According to this method, mercury is forced into different sized pores by varying the pressure exerted on the mercury, i.e., low pressures being used to fill large sized pores and higher pressures being used to fill small sized pores. The total pore volume is then determined and the pore volume distribution calculated from a measure of mercury in the various sized pores and the pressures exerted. Such a determination was accomplished in the instant invention by using a standard commercial mercury porosimeter, (Aminco-Winslow Porosimeter). The pore diameter entered by the mercury under pressure is stated in the equation $$D = \frac{175}{P}$$

where D equals the diameter of the pore in microns and P equals absolute pressure in pounds per square inch. According to the equation, 350 p.s.i. is required to force the mercury into pores having a diameter of 0.5 micron. Since pressures higher than 350 p.s.i. may collapse some pores and compress the samples in the instant invention, pores having a diameter smaller than 0.5 micron may not be accurately measured by this method.

Mercury intrusion date for commercial battery separators of various materials were compared to data obtained for battery separators prepared according to the instant invention. The results are shown in Table I.

battery separator consisted of 15 volume percent of polyethylene, 15 volume percent of silica and 70 volume percent of petroluem oil. The petroleum oil was extracted with trichloroethylene.

To show the presence of exceedingly small pores in the structure of the battery separators of the instant invention, i.e. pores having a diameter in the range of 0.002 to 0.06 micron in diameter, the nitrogen absorption method described by S. Brunauer, P. Emett and E. Teller in J. Am. Chem. Soc., 60, 309 (1938) was used.

The nitrogen absorption test was used to determine the surface area and pore diameter of battery separators of various materials including battery separators prepared according to the instant invention. The results are shown in Table II.

TABLE II

| Battery Separator Material | Nitrogen Absorption Test | |
|---|---|---|
| | Surface Area (Sq. meters/gram) | Mean Pore Diameter (Microns) |
| Rubber Silica hydrogel | 92 | 0.27 |
| Sintered Polyvinyl Chloride | 9 | (¹) |
| Example 5 (15% by vol. polyethylene, 15% by vol. silica and 70% by vol. petroleum oil before extraction) | 135 | .011 |

¹ Pores too large to measure.

As illustrated in Table II, the battery separator prepared according to this invention has a larger surface area and a smaller mean pore diameter than battery separators prepared from two conventional materials. The smaller mean pore diameter shows clearly the presence of exceedingly small pores in the structure of the battery separators prepared according to the instant invention.

The size of the pores of the battery separator of the present invention satisfies the requirements of battery separators in general that the size of the pores be small enough to prevent the passage of solid materials such as lead or lead sulfate crystals but sufficiently large to permit the electrolyte to pass through. In addition, the pores of the instant battery separator are small enough to hinder the passage of antimony ions which frequently are introduced into the electrolyte by the positive plate and which migrate to the negative plate and thereby shorten the life of the battery.

The minute pore size of the separators of the instant invention is in distinct contrast (see Table II) to that of

TABLE I.—MERCURY INTRUSION OF BATTERY SEPARATORS

| Pore Diameter Microns | Volume Percent of Pores | | | | | |
|---|---|---|---|---|---|---|
| | Microporous Polyvinyl Chloride | Rubber Silica Hydrogel | Sintered Polyvinyl Chloride | Polyethylene Cellulose | Example 1 | Example 5 |
| .035–.05 | 0 | 3.6 | 0 | 0 | 25.0 | 11.9 |
| .05–.1 | 1.05 | 5.1 | 1.2 | 0.5 | 33.9 | 27.0 |
| .1–.3 | 0 | 10.3 | 1.2 | 0.5 | 26.8 | 53.8 |
| .3–.5 | 1.05 | 8.7 | 0 | 0.5 | 7.1 | 2.3 |
| .5–.7 | 0 | 7.4 | 0 | 0.5 | 1.8 | 1.1 |
| .7–1.0 | 2.1 | 10.2 | 0 | 0.5 | 1.8 | 1.1 |
| 1.0–2.0 | 16.0 | 23.2 | 0 | 1.4 | 1.8 | 1.1 |
| 2.0–3.0 | 71.3 | 15.4 | 0 | 1.9 | 1.8 | 0.9 |
| 3.0–4.0 | 7.4 | 6.0 | 0 | 1.4 | 0 | 0 |
| 4.0–5.0 | 1.1 | 2.9 | 1.2 | 2.4 | 0 | 0.9 |
| 5.0–10 | 0 | 3.5 | 3.3 | 10.0 | 0 | 0 |
| 10–50 | 0 | 2.3 | 82.0 | 77.5 | 0 | 0 |
| 50–100 | 0 | 1.4 | 11.1 | 2.9 | 0 | 0 |
| Mean Pore Diameter Microns | 2.58 | 1.18 | 36.7 | 16.6 | 0.084 | 0.14 |

In Example 1 of Table I the composition employed in preparing the battery separator consisted of 20 volume percent of polyethylene, 20 volume percent of silica and 60 volume percent of polyethylene glycol. The polyethylene glycol was extacted with water. In Example 5 of Table I the composition employed in preparing the presently available commercial microporous separators. The microporous separators of this invention also distinguish over the prior art in that the void volume of the separator can be greater than that of most commercial separators, (see Table III).

It should be understood, however, that the void volume can vary to a considerable extent depending upon the particular ingredients and thickness of the separator. For example, if the separator is very thin, a void volume as low as 30% is acceptable. It is normally desirable, however, that the void volume of the separator be at least 50%, preferably at least 60%, and more preferably 70 to 80%. The combination of extremely small pore size while maintaining a high void volume in a battery separator which provides good electrical resistance requirements and which possesses excellent physical and chemical properties is very unexpected. These unexpectedly superior properties are believed to be the result of the usage of the above-described very high molecular weight polyolefin. In this respect, compare Examples 4 and 9 of this application to note the good results obtained with polyethylene having a standard load melt index of 0, as compared to those obtained with a low molecular weight polyethylene having a standard load melt index of 0.7.

Table III is a comparison of the average pore diameter and void volume of the separator of this invention prepared as described in Example 2 of the instant application and commercial separators. In Example 2 of the composition employed in preparing the battery separator consisted of 10% by volume of polyethylene 15% by volume of silica and 75% by volume of petroleum oil. The petroleum oil was extracted from the molded composition with petroleum ether and the percent void volume shown in Table III is based on the extracted amount of petroleum oil. The average pore diameter of the separator of Example 2 was measured by mercury intrusion on an Aminco-Winslow Porosimeter.

TABLE III

| Separator | Average Pore Diameter, Microns | Void Volume,* Percent |
|---|---|---|
| Sintered Polyvinyl Chloride | 36.7 | 48 |
| Sintered Polyethylene | *50 | 47 |
| Microporous Polyvinyl Chloride | 2.58 | 87 |
| Rubber/Silica Hydrogel | 1.18 | 66 |
| Polyethylene Cellulose | *33.0 | 70 |
| Standard Cellulose | 40.0 | 67 |
| Example 2 | 0.11 | 75 |

*Values are taken from a paper by Robinson and Walker, Third International Battery Symposium, Bournemouth, England, October 1962, except for the value for Example 2.

The thickness of the battery separators will vary depending upon the type of battery in which they are used. In general, the thickness of the base web can range from 1 to 50 mils. For lead-acid batteries the preferred thickness range is usually 10 to 40 mils. The height of the rib members for lead-acid battery separators vary over a wide range depending upon the plate spacing requirements, generally ribs from 5 to 200 mils in height from the base web are employed with the preferred range being 10 to 100 mils. For alkaline type batteries, the preferred thickness is generally about 1 to 10 mils.

In order to be commercially acceptable, battery separators must meet minimum electrical resistance requirements. Generally, the acceptable range is from 1 to 100 milliohms-square inch, with the preferred range being from 10 to 75 milliohms-square inch.

Battery separators should possess chemical properties such as resistance to oxidation, and resistance to loss of weight in acid in order to be suitable for commercial usage. To demonstrate the superior qualities of the separators of this invention, samples made from a polyethylene-filler-plasticizer blend were subjected to these tests and compared with other commercial separators. The results are summarized in Table IV.

TABLE IV

| Separator | Oxidation Test [1] (hours) | Acid Weight Loss [2] (percent) | Fast Acid Weight Loss [3] (percent) |
|---|---|---|---|
| 4 | 227+ | 1.6 | 0.5 |
| 5 | 227+ | 0.6 | |
| Sintered Polyvinyl Chloride | 227+ | 1.5 | 2.7 |
| Microporous Polyvinyl Chloride | 227+ | 61.3 | 28.6 |
| Rubber/Silica Hydrogel | 208 | 8.6 | Destroyed |
| Polyethylene Cellulose | 114 | 31.0 | 44.8 |

[1] Oxidation test was made at ambient temperatures by placing the separator between electrodes, immersing the resulting assembly in a sulfuric acid solution having a specific gravity of 1.400, passing a current of 9 amperes through the circuit which provided a current density of 3 amperes per square inch, and maintaining the current of 9 amperes until short circuiting occurs.
[2] 168 hours in 1.3000 sp. gr. $H_2SO_4$ at 165° F.
[3] 3 hours at 140° F. in 3% potassium dichromate in 1.200 sp. gr. $H_2SO_4$.
[4] This is Example 18: 17 vol. percent polyethylene (SLMI=0, HLMI=0), 18 vol. percent finely ground silica, 44 vol. percent glycerin and 21 vol. percent petroleum oil was processed into a sheet 0.028" thick and the glycerin and paraffin oil were extracted with water and petroleum ether.
[5] Same as 4, but thickness was 0.020".

As noted in Table IV, there is significantly less loss of material in acid with the separators made from the polyethylene-filler-plasticizer blends of the instant invention than with the commercial separators.

Acceptable battery separators must also possess certain physical properties, such as tensile strength, puncture strength, break angle strength, and pore volume.

This invention is further illustrated by the following examples. Unless otherwise stated, tests in the following examples were made as follows: the tensile strength of the samples was measured by a standard commercial tensile tester which continually records stress as it pulls the sample at a constant rate of strain. Unless otherwise specified, the tensile strength of the sample was measured in the extrusion direction of the sample.

The resistance to puncture of the samples was measured as follows: A ¼ inch diameter probe (connected via a lever arm to a container) with a rounded end is placed on the sample. Water is added to the container above the probe on the lever arm until the sample is punctured. The weight of water added is recorded.

The samples were also subjected to a break angle test. The purpose of this test is to determine the flexibility of the samples by measuring the angle at which the sheet breaks when bent by hand.

The samples were also tested to determine their pore volume and average pore diameter. Unless otherwise stated these were determined according to the mercury intrusion method on an Aminco-Winslow Porosimeter.

The crystallinity of the polyolefins was determined by an X-ray diffraction method described by J. L. Matthews, H. S. Pieser and R. B. Richards in Acta Crystallographica 2, 85–90 (1949). According to this method, the crystal-Polyethylene ("Grex FF–60–018")

| | Percent by weight |
|---|---|
| Polyethylene ("Grex FF–60–018") | |
|   Particle form | 72 to 75 |
| Polyethylene ("Hifax 1901") | |
|   Particle form | 83.3 |
|   Pressed sheet | 58.4 |
| Polypropylene | |
|   Particle form | 45.6 |
|   Pressed sheet | 45.7 |
|   Annealed sheet | 51.5 |
|   Quenched sheet | 35.8 |

*Example 1*

The polyethylene ("Grex FF–60–018") used in this example had an average molecular weight of 350,000, a standard load melt index of 0, a high melt index of 1.8, a density of 0.95, and a reduced specific viscosity of 4.0. The filler was a finely divided silica ("HiSil 233") having an average particle diameter of about 0.02 micron and a surface area of 165 square meters per gram.

Using the system described, a composition consisting of 20 volume percent of the polyethylene, 20 volume percent of the silica, 60 volume percent polyethylene glycol of 4,000 molecular weight ("Polyglycol E, 4000"), and the antioxidant, phenothiazine, in an amount of 0.05 percent by weight of the composition (0.36 percent by weight of the polyethylene), was mixed in a two-roll mill for a period of about 10 minutes and removed in sheet form. After grinding in a Wiley mill, the composition was fed to the hopper of a one-inch extruder which was operating at a speed of 70 r.p.m. and at a pressure of 400 p.s.i. Attached to the extruder was an eight inch sheeting die. The temperature profile which was progressively spaced along the length of the extruder from the feed end to the die end was 200° F., 350° F. and 350° F. The extruder was adjusted so as to operate at a speed of approximately 1½ feet per minute. The extruded composition was then immersed in water for 20 hours at 130° F. to extract the polyethylene glycol plasticizer. The thickness of the composition was found to be 49 mils. The extracted sheet was composed of 50 volume percent polyethylene and 50 volume percent of silica.

The polyethylene-silica sample was then analyzed by standard techniques to determine its electrical resistance which was found to be 70 milliohms-square inch. When subjected to the puncture test, it was found that the sample was able to withstand a force of 673 grams. The tensile strength of the sample was 210 lbs. per square inch. The break angle of the sample was 85 degrees. The pore volume was found to be 0.30 cc./g. The mean pore diameter was 0.084 micron.

*Example 2*

The procedure of Example 1 was followed. The polyethylene and the silica of Example 1 was also used. A composition consisting of 10 percent by volume of the polyethylene, 15 percent by volume of the silica, 75 percent by volume of petroleum oil ("Shellflex 411," 547 SSU at 110° F.) and the antioxidant, 2,6-di-tert-butyl-4-methylphenol ("Ionol") in an amount of 0.1 percent by weight of the composition (1.15 percent by weight of the polyethylene), was blended on a two-roll mill for about 5 minutes and removed as sheet. After grinding on a Wiley mill, the composition was fed into the hopper of a standard one-inch extruder to which was attached an eight inch sheeting die. The pressure within the extruder was 500 p.s.i. The temperature profile along the length of the extruder from the feed end to the die end progressively decreased from 400 to 300° F. with the die at 350° F. The extrusion rate was again approximately 1½ feet per minute. The extruded composition was then immersed in petroleum ether for 60 minutes at room temperature to extract the petroleum oil. The thickness of the final product was 26 mils, and the composition was 40 volume percent polyethylene and 60 volume percent silica.

This sample was then tested to determine its properties. The electrical resistance of this sample was found to be 22 milliohms-square inch. The puncture test indicated that this sample could withstand a force of 366 grams. The tensile strength was 220 lbs. per square inch. The break angle was found to be greater than 110°. The pore volume was determined to be 0.71 cc./g. The mean pore diameter was 0.11 micron.

*Example 3*

The procedure of Example 1 was generally followed. The polyethylene, silica and petroleum oil used in this example were the same as that used in Example 2. A composition consisting of 20 volume percent of the polyethylene, 15 percent by volume of the silica, and 65 percent by volume of petroleum oil was mixed in a two-roll mill for about 5 minutes and removed as sheet. The product was immersed in trichloroethylene for 60 minutes at room temperature to remove the petroleum oil. The thickness of the final product was 23 mils and the composition was 60 volume percent polyethylene and 40 volume percent silica.

The electrical resistance of this sample was found to be 66 milliohms-square inch. This sample was able to withstand a force of 1313 grams. The tensile strength was 580 lbs. per square inch. The break angle was greater than 110°. The pore volume was found to be 0.76 cc./g. The mean pore diameter was 0.12 micron.

*Example 4*

The polyethylene, silica and petroleum oil used in this example were the same as that used in Example 2.

A composition consisting of 17 percent by volume of the polyethylene, 18 percent by volume of the silica, 21 percent by volume of petroleum oil, 44 percent by volume glycerol and 2,6-di-tert-butyl-4-methylphenol ("Ionol") in an amount of 0.1 percent by weight of the composition was pelletized by extrusion. This composition was then fed to an extruder to which was attached an eight inch sheeting die. The extruder was operated at a speed of 60 r.p.m. and at a pressure of 550 p.s.i. The temperature profile from the feed end to the die end progressively increased from 300° F. to 350° F. The extruded product was immersed in water for 6 hours at room temperature to extract the glycerol. The resulting product was then immersed for 1 hour in petroleum ether to extract the petroleum oil. The thickness of the final product was approximately 37 mils and the composition was 48.5 volume percent of polyethylene and 51.5 volume percent silica.

The electrical resistance of this product was 64 milliohms-square inch. This product was able to withstand a force of 1573 grams. The tensile strength of the product was 535 lbs. per square inch. The percent elongation at failure was 35 percent. The break angle was greater than 150°. The pore volume was found to be 0.41 cc./g. The mean pore diameter was 0.10 micron.

*Example 5*

The polyethylene, silica and petroleum oil used in this example were the same as that used in Example 2.

A composition consisting of 15 percent by volume of the polyethylene, 15 percent by volume of the silica, 70 percent by volume of the petroleum oil, and 2,6-di-tert-butyl-4-methylphenol ("Ionol") in an amount of 0.1 percent by weight of the composition (0.77 percent by weight of polyethylene), was mixed on a two-roll mill for about 5 minutes, and removed as sheet. After grinding, the composition was fed to an extruder which was operating at approximately 60 r.p.m. and at a pressure of 400 p.s.i. An eight inch sheeting die was attached to the extruder. The temperature profile within the extruder progressively decreased from a temperature of 375° F. at the feed end to 300° F. with the die at 325° F. The extrusion rate was again approximately 1½ feet per minute. The extruded product was then immersed in trichloroethylene at 180° F. for 90 minutes to extract the oil. The thickness of the final product was found to be 32 mils.

The electrical resistance of this product was found to be 36 milliohms-square inch. This product was able to withstand a force of 1013 grams. The tensile strength of the product was 375 lbs. per square inch. The break angle was greater than 110°. The pore volume was found to be 0.88 cc./g. The mean pore diameter was 0.14 micron.

*Example 6*

The silica and petroleum oil used in this example were the same as that used in Example 2. The polyethylene ("Hifax 1901") had an average molecular weight of 2,000,000, a standard load melt index of 0, a high load melt index of 0, a density of 0.94 grams/cc. and a reduced specific viscosity of 15.

A composition consisting of 10 volume percent of the polyethylene, 15 volume percent of the silica, 75 percent by volume petroleum oil, and the antioxidant, 2,6-di-tert-butyl-4-methylphenol ("Ionol") in an amount of 0.1 percent by weight of the composition was mixed in a Brabender Plastograph for 15 minutes. This composition was then compression molded. The product was then immersed in petroleum ether for 60 minutes at room temperature to remove the petroleum oil. The thickness of the final product was 33 mils.

The electrical resistance $e$ of this sample was 32 milliohms-square inch. The sample could withstand a force of 1973 grams. The tensile strength was 430 lbs. per square inch. Break angle was greater than 110°.

Example 7

The polyethylene, silica and petroleum oil used in this example were the same as that used in Example 2.

Using the system described, a composition consisting of 14.5 volume percent of the polyethylene, 14.5 percent by volume of the silica, 2.5 percent by volume of carbon black ("Elftex 8") having an average particle size of 0.03 micron in diameter, and 68.5 percent by volume of petroleum oil was mixed in a two-roll mill for about 5 minutes and removed as sheet. After grinding the sheet, the composition was fed into the hopper of an extruder which was operating under approximately the same conditions as in Examples 2 and 3. The extruded product was then immersed in trichloroethylene for 10 minutes at 180° F. to extract the petroleum oil. The thickness of the final product was 32 mils.

The electrical resistance of this product was determined to be 48 milliohms-square inch. The product was able to withstand a force of 1143 grams. The tensile strength of the product was 415 lbs. per square inch. The break angle was greater than 110°.

Example 8

The polyethylene used in this example was the same as that used in Example 6.

A composition consisting of 20 volume percent polyethylene, 12 percent by volume of carbon black ("Elftex 8") having an average particle size of 0.03 micron in diameter, and 68 percent by volume paraffin oil ("Primol," 335 SSU at 100° F.) was mixed in a Brabender Plastograph for 15 minutes. The composition was compression molded and a thin film blown on a Cryovac hat tester. Briefly stated, this operation comprised securing the outer periphery of the 20-mil thick film in the apparatus, heating the film and then projecting compressed air against one wall of the heated film to form a bubble to draw its wall to the desired thickness.

The sample was immersed in petroleum ether at room temperature to extract the paraffin oil. The thickness of the final product was about 1 mil. The product had an electrical resistance of 4 milliohms-square inch after treatment with wetting agent.

Example 9

To illustrate the importance of the polyethylene having a high molecular weight and a standard load melt index of 0, this run was conducted using a commercial pelletized polyethylene ("Grex 60007 E") having a standard load melt index of 0.7, an average molecular weight of 112,000 and a reduced viscosity of 2.2. Except for the polyethylene component, this composition was the same as that of Example 4. Seventeen volume percent of the polyethylene of standard load melt index of 0.7, 18 percent by volume silica, 21 percent by volume petroleum oil and 44 percent by volume glycerol was mixed in a Brabender Plastograph for 15 minutes. This composition was then compression molded and immersed first in water and then in petroleum ether as described in Example 4 to extract the glycerol and petroleum oil. The thickness of the product was 31 mils.

The electrical resistance of the sample was 60 milliohms-square inch. The tensile strength was 287 lbs. per square inch. The percent elongation at failure was only 1 percent. The break angle was less than 45°. When subjected to the puncture test, it was found that the sample failed completely; that is, it was unable to withstand even the slightest force, crumbling under pressure. It is concluded from the foregoing that this sheet is too brittle to be employed.

Example 10

The procedure of Example 1 was generally followed. The polyethylene and petroleum oil used in this example were the same as that disclosed in Example 2. The composition consisted of 15 volume percent of polyethylene, 69 volume percent of petroleum oil, 15 volume percent of diatomaceous earth ("Celite Filter Cel") having an average particle diameter of 4 microns and a surface area of 25 square meters per gram. 1 volume percent of carbon black ("Sterling MT") having an average particle diameter of 0.47 micron and a surface area of 6 square meters per gram and the antioxidant, 4,4-thiobis(6-tert-butyl-m-cresol) ("Santonox") in an amount of 0.1 percent by weight of the polyethylene.

The composition was blended, ground and extruded substantially as described in Example 1. The extruded composition was then immersed in petroleum ether for 30 minutes at room temperature to extract the petroleum oil. The thickness of the final product was 18 mils.

The product was then tested to determine its properties. It was able to withstand a force of 1260 grams of water. The product had a tensile strength of 500 p.s.i. in the extrusion direction and 910 p.s.i. in the cross extrusion direction. It had a break angle greater than 110°. The electrical resistance of the product was greater than 100 milliohms-square inch. However, after the product was soaked in a 1 percent solution of a standard commercial wetting agent for 60 minutes, its resistance was 27 milliohms-square inch.

Example 11

The procedure of Example 1 was generally followed. The polyethylene, silica and petroleum oil used in this example were the same as that used in Example 2. The composition consisted of 15 volume percent of polyethylene, 69 volume percent of petroleum oil, 15 volume percent of silica, 1 volume percent of carbon back ("Stering MT") having an average particle diameter of 0.47 micron and a surface area of 6 square meters per gram and the antioxidant 4,4-thiobis(6-tert-butyl-m-cresol) ("Santonox") in an amount of 0.1 percent by weight of the polyethylene.

The composition was blended, ground and extruded substantially as described in Example 1. The extruded composition was then immersed in petroleum ether for 30 minutes at room temperature to extract the petroleum oil. The thickness of the final product was 29 mils.

The product was then tested to determine its properties. It was able to withstand a force of 1100 grams of water. The product had a tensile strength of 430 p.s.i. in the extrusion direction and 510 p.s.i. in the cross extrusion direction. It had a break angle greater than 110°. The electrical resistance of the product was 44 milliohms-square inch. However, after the product was soaked in a 1 percent solution of a standard commercial (e.g., sodium dodecyl benzene sulfonate) wetting agent for 60 minutes, its resistance was 28 milliohms-square inch.

Example 12

The polyethylene and petroleum oil used in this example were the same as those disclosed in Example 2. The composition consisted of 20 volume percent of polyethylene, 60 volume percent of petroleum oil, 20 volume percent of precipitated calcium carbonate ("Purecal U") having an average diameter of 0.040 micron and 2,6-ditert-butyl-4-methylphenol ("Ionol") in an amount of 1.0 percent by weight of the polyethylene.

The composition was blended in a Banbury and then placed in a platen press and pressed at about 350° F. at a pressure of 40,000 lbs. for about 3 minutes. The resulting film, which was 20 mils thick, was then blown into a thin film by means of a Cryovac hat tester as described in Example 8.

The resulting film was less than 5 mils thick. This thin film was then immersed in petroleum ether for 30 minutes at room temperature to extract the petroleum oil. The resulting product had an electrical resistance of 8 milliohms-square inch.

*Example 13*

The procedure and composition used in this example were the same as that described in Example 12 except that 15 volume percent of polyethylene, 15 volume percent of precipitated calcium carbonate and 70 volume percent of petroleum oil were used. The resulting product, a film less than 5 mils thick, had an electrical resistance of 35 milliohms-square inch.

*Example 14*

The polyethylene and petroleum oil used in this example were the same as those disclosed in Example 2. The composition consisted of 30 volume percent of polyethylene, 40 volume percent of petroleum oil, 30 volume percent of a very finely divided kaolin clay ("Clemson Clay") ordinarily used as filler in paper, and 2,6-di-tert-butyl-4-methylphenol ("Ionol") in an amount of 0.1 percent by weight of the polyethylene.

The composition was blended in a Banbury and then blown into a thin film. In this blowing operation, the blend was extruded into a tube, and while the tube was still hot, compressed air was injected into it to form a bubble to draw its wall to the desired thickness. The bubble was then collapsed and slit.

The blown thin film was about one mil thick. It was immersed in petroleum ether for 30 minutes at room temperature to extract the petroleum oil. The resulting film had an electrical resistance of over 100 milliohms-square inch. However, after the film was soaked in a 1 percent solution of a standard commercial wetting agent solution (e.g., sodium dodecyl benzene sulfonate) for 60 minutes, its electrical resistance was 15 milliohms-square inch.

*Example 15*

The petroleum oil and silica used in this example were the same as those disclosed in Example 2. A composition consisting of 15 volume percent polypropylene having a standard load melt index 0, a reduced viscosity of 20 and a molecular weight in excess of 1,000,000, 15 volume percent of silica, 70 volume percent of petroleum oil and an antioxidant were thoroughly mixed in a Brabender Plastograph. The antioxidant was comprised of 2,6-di-tert-butyl-4-methylphenol ("Ionol") in an amount of 0.5 percent by weight of the polypropylene, dilaurylthiodipropionate in an amount of 0.5 percent by weight of the polypropylene and calcium stearate in an amount of 0.2 percent by weight of the polypropylene.

The mixture was placed in a platen press and pressed at about 350° F., at a pressure of 40,000 lbs. for about 3 minutes. The resulting film was immersed in petroleum ether at room temperature for 60 minutes to extract the petroleum oil. The thickness of the final product was 25 mils.

The electrical resistance of the product was determined to be 47 milliohms-square inch.

*Example 16*

The petroleum oil and silica used in this example were the same as those disclosed in Example 15. The procedure used in this example was the same as that disclosed in Example 15.

The composition consisted of 15 volume percent of a 99 mole percent ethylene–1 mole percent butene copolymer having a standard load melt index of 0, a high load melt index of 1.7 and a crystallinity of over 50 percent by weight, 15 volume percent of silica, 70 volume percent of petroleum oil and 2,6 - di - tert - butyl - 4 - methylphenol ("Ionol") in an amount of 1.0 percent by weight of the copolymer. The thickness of the final product was 22 mils.

The resistance of this product was determined according to the standard technique except that it was presoaked under a vacuum of 27 inches of mercury. The electrical resistance was 30 milliohms-square inch. The product had a tensile strength of 440 p.s.i. It was able to withstand a force of 486 grams in the puncture resistance test.

*Example 17*

In this experiment, the battery separator prepared as described in Example 11 was provided on one side with a plurality of ribs of foamed polyethylene.

A composition consisting of 100 parts of a polyethylene having a density of 0.92, 1 part of a blowing agent, azo-bis-formamide, ("Kempore 150"), 0.5 part zinc stearate and 1.6 parts of carbon black was mixed thoroughly. The mixture was extruded at a temperature of about 155° C. i.e., a temperature below the decomposition temperature of the blowing agent which was 175° C. The extruded mixture was cooled and cut to form pellets.

The pellets were then passed through an extruder maintained at a temperature above the decomposition temperature of the blowing agent, i.e., 180° C. to form a plurality of thin ribs of foamed polyethylene. The ribs were deposited on one side of the battery separator which had been preheated to a temperature of about 80° C. The composite was allowed to cool to room temperature. Good adhesion of the ribs to the separator was obtained.

*Example 18*

The polyethylene, petroleum oil and silica used in this example were the same as that disclosed in Example 6.

A composition comprised of 17 volume percent of polyethylene, 18 volume percent glycerol, and 2,6-di-tert-butyl-4-methyl-penol ("Ionol") in an amount of 0.12 percent by weight of the composition (0.95 percent by weight of the polyethylene) was mixed in a Banbury for about five minutes. A portion of the resutling composition was compression molded to form a sheet 28 mils thick. A second portion of the resulting composition was compression molded to form a sheet 20 mils thick.

Each sheet was immersed in petroleum ether for one hour at room temperature to remove the petroleum oil. The sheet was then immersed in water at room temperature for about 16 hours to extract the glycerol.

The electrical resistance of the 28 mil thick sheet was determined to be 49 millohms-square inch. The electrical resistance of the 20 mil thick sheet was determined to be 20 milliohms-square inch.

*Example 19*

The composition used in this example was the same as that described in Example 18. It was mixed and compression molded to form a sheet as disclosed in Example 19.

The sheet was immersed in petroleum ether for one hour at room temperature to remove the petroleum oil. The sheet was then immersed in water at room temperature for about 16 hours to remove the gylcerol. At the end of this time, it was removed from the water and immersed in about 25% potassium hydroxide solution for about 16 hours to extract the silica. The sheet was then washed off with water.

The sheet was 27 mils thick and had an electrical resistance of 7 milliohms-square inch. It was able to withstand a force of 510 grams of water. The tensile strength of the sheet was 160 p.s.i.

Example 20

The polyolefin, the silica and the petroleum oil were the same as that employed in Example 16. A composition consisting of 15 volume percent of the ethylene-butene copolymer, 15 volume percent of silica (HiSil 233) and 70 volume percent of the petroleum oil was prepared. In addition, an antioxidant, 4,4-thiobis(6-tert-butly-m-cresol), was added to the composition at a level of 0.1 percent by weight based on the weight of the composition and carbon black having an average particle size of 0.47 microns and a surface area of six square meters per gram was added in an amount 1.5 percent based on the weight of the composition. The above components were premixed in a ribbon blender and then fed to a twin screw extruder and the composition was continuously extruded to form a sheet. The sheet was then fed to counter current extractor containing a solution of hexane and petroleum oil whereby all but 7 volume percent of the petroleum was extracted.

The sheet was 20 mils in thickness, had an electrical resistance of 30 milliohms-square inch and a puncture resistance of 800 grams. When subjected to SAE Life Cycle Tests, the separator was found to survive the lives of five automotive (SLI) batteries.

Example 21

The polyolefin employed in this example was the same as that employed in Example 6 and the petroleum oil and silica were the same as that employed in Example 15.

The ratio of ingredieints and the method of processing was the same as that disclosed in Example 20 except that subsequent to the premixing and prior to the extrusion, the composition was fed to a twin screw extruder, extruded into strands and pelletized. The pelletized material was then fed to the twin screw extruder for extrusion into sheet form. The composition was then extracted in accordance with the procedure of Example 20.

The sheet was 20 mils in thickness, had an electrical resistance of 30 milliohms-square inch, and a puncture resistance of 2000 grams. The separator was found to survive five automotive (SLI) batteries when tested according to SAE Life Cycle Methods.

Example 22

The effectiveness of a separator in preventing loss in battery capacity as a result of antimony migration from the positive plate to the negative plate through the separator was determined in a conventional 12 volt 60 ampere hour lead acid battery.

During the charge discharge cycles of the battery, the antimony dissolves from the positive grid, migrates through the sulfuric acid electrolyte and the battery separator, and deposits on the negative plate which results in a loss in capacity of the battery. At least part of the lead sulfate produced during this self discharge is formed irreversibly. Thus the battery loses some of its capacity permanently.

The battery separator used in this example was prepared substantially as described in Example 17. This separator was placed in the lead storage battery and its effectiveness in preventing antimony ion transfer during "charge" "discharge" cycles of the lead storage battery was tested according to the procedure. The procedure employed is described in Robinson, R. G., and Walker, R. L., "Separators and Their Effect on Lead-Acid Battery Performance," in Collins, D. H., Ed., Batteries, MacMillan Co., N.Y., 1963, p. 28. One complete cycle of this test is comprised of the following:

(a) 4½ days' continuous charge at the normal rate of 3 amperes at 70° F.
(b) 7 days' stand on open circuit at 100° F.
(c) A discharge at the 10 hour rate to 1.8 volts per cell at 70° F.
(d) A full recharge
(e) A discharge at the 10 hour rate to 1.8 volts per cell at 70° F. From the discharges under (c) and (e) the percentage loss in capacity during the 7 days' open circuit stand was calculated.

The percent capacity loss at the end of the sixth cycle was determined and the results were as follows:

| Battery separator | Percent capacity loss at end of sixth cycle |
|---|---|
| Battery separator prepared substantially as described in Example 17 | 17 |
| Microporous rubber | 28 |
| Microporous polyvinyl chloride ("Porvic 1") | 21 |
| Sintered polyvinyl chloride ("Porvic 2B") | 75 |
| Rubber and diatomaceous silica backed with spun fiber mat ("Permalife") | 43 |

The above results show a significantly lower loss in capacity for the battery using the separator prepared according to the instant invention.

It is thus seen that a novel and relatively inexpensive battery separator of superior quality has been disclosed. This battery separator of superior quality has been disclosed. The battery separator is suitable for usage in batteries employing an acid electrolyte as, for example the lead acid type, and also in batteries employing an alkaline electrolyte such as the silver-zinc, air zinc or nickel-cadmium types.

It is to be understood that many equivalent modifications will be apparent to those skilled in the art from a reading of the foregoing disclosure without a departure from the intended concept of the invention. For example, it is to be clearly understood that the process of this invention will be operated in a continuous manner when in actual production and that this is within the scope of this invention.

Although the instant invention is described in connection with battery separators, it can easily be adapted for other uses such as fuel cells, selective filtration or purification membranes, e.g., for use in water purification or biomedical applications, and breathable coatings for textile fabrics such as rainwear.

What is claimed is:

1. A battery separator having an essentially flat surface and comprising a microporous polyolefin having a molecular weight of at least 300,000, a standard load melt index of substantially 0, and a reduced viscosity of not less than 4.0.

2. A battery separator according to claim 1 wherein said polyolefin is polyethylene.

3. A battery separator as defined in claim 1 wherein said polyolefin is an ethylene-butene copolymer.

4. A battery separator according to claim 1 wherein the web has pores at least 50 percent of which are less than 0.5 micron in diameter and a void volume of at least 50 percent.

5. A battery separator according to claim 1 wherein at least 90 percent of the pores are less than 0.5 micron in diameter.

6. A microporous battery separator having an essentially flat surface comprising a homogeneous mixture of 8 to 100 volume percent of polyolefin having a molecular weight of at least 300,000, a standard load melt index of 0 and a reduced viscosity of not less than 4.0, 0 to 40 volume percent of a plasticizer and 0 to 92 volume percent of inert filler material.

7. A product as defined in claim 6 wherein said polyolefin is present at a level of 40 to 60 volume percent, said plasticizer is present at a level of 1 to 10 percent and said filler is present at a level of 40 to 60 volume percent.

8. A product as defined in claim 6 wherein said polyolefin is polyethylene, said filler is finely divided silica, and said plasticizer is petroleum oil.

9. A battery separator according to claim 6 wherein the base web has pores at least 50 percent of which are less than 0.5 micron in diameter and a void volume of at least 50 percent.

10. A battery separator according to claim 9 wherein at least 90 percent of the pores are less than 0.5 micron in diameter.

11. A microporous battery separator comprising a homogeneous mixture of 46.5 volume percent of polyolefin having a molecular weight of at least 300,000, a standard load melt index of 0 and a reduced viscosity of not less than 4.0, 46.5 volume percent of finely divided silica and 7 volume percent of the petroleum.

References Cited

UNITED STATES PATENTS

| 2,700,694 | 1/1955 | Fernald | 136—146 |
| 3,026,366 | 3/1962 | Comeau et al. | 136—145 |
| 3,045,058 | 7/1962 | Martinak | 136—146 |

WINSTON A. DOUGLAS, *Primary Examiner.*

D. L. WALTON, *Assistant Examiner.*